US011691856B2

(12) United States Patent
Ryan

(10) Patent No.: US 11,691,856 B2
(45) Date of Patent: Jul. 4, 2023

(54) CYLINDER PROPPING SYSTEM

(71) Applicant: Oshkosh Corporation, Oshkosh, WI (US)

(72) Inventor: Robert Ryan, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 655 days.

(21) Appl. No.: 16/783,315

(22) Filed: Feb. 6, 2020

(65) Prior Publication Data

US 2020/0262688 A1 Aug. 20, 2020

Related U.S. Application Data

(60) Provisional application No. 62/805,780, filed on Feb. 14, 2019.

(51) Int. Cl.
*F15B 15/14* (2006.01)
*B66F 1/02* (2006.01)
*B60P 1/28* (2006.01)
*B60P 1/16* (2006.01)
*B60P 1/20* (2006.01)
*B60P 1/267* (2006.01)
*F15B 15/26* (2006.01)

(52) U.S. Cl.
CPC ............. *B66F 1/025* (2013.01); *B60P 1/162* (2013.01); *B60P 1/20* (2013.01); *B60P 1/267* (2013.01); *B60P 1/283* (2013.01); *F15B 15/1428* (2013.01); *F15B 2015/267* (2013.01)

(58) Field of Classification Search
CPC .... F15B 15/26; F15B 15/14; F15B 2015/267; B65F 2210/148; B65F 3/24; B65F 3/26; B60P 1/28; B60P 1/283
See application file for complete search history.

(56) References Cited

U.S. PATENT DOCUMENTS

| 3,254,919 | A | * | 6/1966 | Birchmeier | ........ B62D 33/0273 188/300 |
| 3,883,126 | A | * | 5/1975 | Nicholls | ............... F16F 9/0254 296/76 |
| 4,043,253 | A | * | 8/1977 | Albright | ................. E02F 3/388 92/25 |
| 4,078,779 | A | * | 3/1978 | Molders | ................ F16F 9/0254 188/300 |
| 4,155,433 | A | * | 5/1979 | Porter | .................... B60N 2/231 188/300 |
| 4,276,814 | A | | 7/1981 | Bass et al. | |
| 4,811,983 | A | * | 3/1989 | Watts | .................... F16F 9/0254 248/407 |
| 4,890,703 | A | * | 1/1990 | Hathaway | ............. F16F 9/0254 188/300 |

(Continued)

*Primary Examiner* — Thomas E Lazo
(74) *Attorney, Agent, or Firm* — Foley & Lardner LLP

(57) ABSTRACT

A cylinder propping system includes a sleeve and a locking member. The sleeve includes an outer wall that defines an inner cavity and a ledge. The inner cavity is sized to receive at least a portion of a cylinder assembly therein. A first end of the outer wall is configured to hingedly couple to one end of the cylinder assembly. The ledge is spaced apart from the first end. The locking member is sized to engage with the ledge, between the ledge and a cylinder housing of the cylinder assembly, to prevent movement of the cylinder housing in at least one direction along a central axis of the sleeve.

17 Claims, 6 Drawing Sheets

(56) References Cited

U.S. PATENT DOCUMENTS

| | | | | |
|---|---|---|---|---|
| 5,009,566 A | * | 4/1991 | Asche | E02F 3/388 |
| | | | | 414/722 |
| 5,158,340 A | * | 10/1992 | Boda | B65F 3/00 |
| | | | | 298/23 M |
| 5,634,762 A | * | 6/1997 | Kim | E02F 3/388 |
| | | | | 212/292 |
| 6,149,374 A | * | 11/2000 | Dershem | E02F 9/24 |
| | | | | 212/292 |
| 6,666,491 B2 | | 12/2003 | Schrafel | |
| 7,070,381 B2 | * | 7/2006 | Khan | B65F 3/00 |
| | | | | 298/22 C |
| 8,752,810 B2 | * | 6/2014 | Anderson | F16F 9/56 |
| | | | | 188/300 |
| 9,387,985 B2 | * | 7/2016 | Gillmore | B65F 3/00 |
| 2017/0341860 A1 | | 11/2017 | Dodds et al. | |
| 2019/0322321 A1 | | 10/2019 | Schwartz et al. | |

\* cited by examiner

CYLINDER PROPPING SYSTEM

CROSS-REFERENCE TO RELATED PATENT APPLICATIONS

The present application claims the benefit of U.S. Provisional Patent Application No. 62/805,780, filed on Feb. 14, 2019, which is incorporated herein by reference in its entirety.

BACKGROUND

Many on and off-road vehicles include components that move relative to a chassis (e.g., frame) of the vehicle to facilitate vehicle operations. Some examples of moving components include loading forks used by garbage trucks to raise and lower refuse collection containers, a front end loading mechanism for a construction vehicle (e.g., a bucket attachment for a front end loader or skid steer loader), etc. The moving components may be coupled to a cylinder assembly. The cylinder assembly may include a cylinder housing and a cylinder. A vehicle operator may extend and retract the cylinder relative to the cylinder housing to raise, lower, or otherwise manipulate the moving component of the vehicle.

In some instances, the vehicle may additionally include a propping system configured to prevent the cylinder from inadvertently retracting into the cylinder housing. For example, the propping system may be used to prevent the cylinder from retracting into the cylinder housing when the vehicle is turned off or for safety reasons to prevent the operator from accidentally lowering a heavy load while the vehicle is operating. These propping systems generally utilize long arms that rotate into contact with the fully extended cylinder. The arms are usually quite heavy (e.g., the arms may be made from steel having a large material thickness to ensure adequate support for raised components and loads) and typically require manual manipulation by the operator to activate.

SUMMARY OF THE INVENTION

One embodiment of the present disclosure relates to a cylinder propping system including a sleeve and a locking member. The sleeve includes an outer wall that defines an inner cavity and a ledge. The inner cavity is sized to receive at least a portion of a cylinder assembly therein. A first end of the outer wall is configured to hingedly couple to one end of the cylinder assembly. The ledge is spaced apart from the first end. The locking member is sized to engage with the ledge, between the ledge and a cylinder housing of the cylinder assembly, to prevent movement of the cylinder housing in at least one direction along a central axis of the sleeve, Another embodiment of the present disclosure relates to a lift system for a vehicle. The lift system includes a cylinder assembly and a cylinder propping system coupled to one end of the cylinder assembly. The cylinder assembly includes a housing and a cylinder slidably engaged with the cylinder housing. The cylinder propping system includes a sleeve, and a locking member. The sleeve includes an outer wall that surrounds at least a portion of the cylinder assembly. The locking member is sized to engage with the sleeve to prevent movement of the cylinder housing in at least one direction along a central axis of the sleeve.

Another embodiment of the present disclosure relates to a vehicle including a chassis, a body coupled to the chassis, and a lift system coupled to the chassis and the body. The lift system includes a cylinder assembly and a cylinder propping system coupled to one end of the cylinder assembly. The cylinder assembly includes a housing and a cylinder slidably engaged with the cylinder housing. The cylinder propping system includes a sleeve, and a locking member. The sleeve includes an outer wall that surrounds at least a portion of the cylinder assembly. The locking member is sized to engage with the sleeve to prevent movement of the cylinder housing in at least one direction along a central axis of the sleeve.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
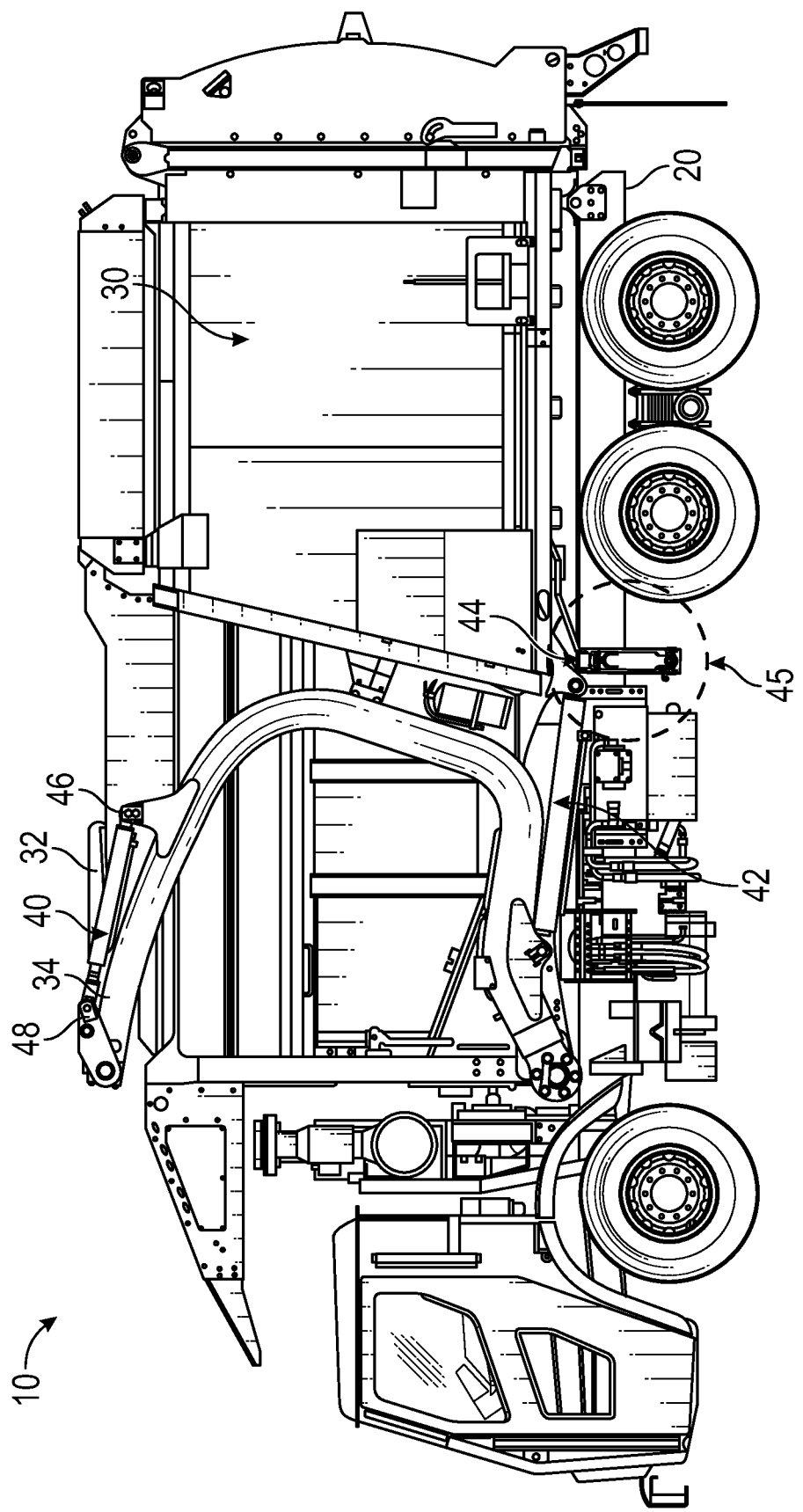
FIG. 1 is a side view of a refuse truck including a cylinder propping system, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes a cylinder propping system configured to prevent movement of a vehicle component in at least one position. The vehicle includes a cylinder assembly coupled to the vehicle component. The cylinder assembly includes a cylinder housing and a cylinder. The cylinder is configured to move relative to the cylinder housing to manipulate a position of the vehicle component. The propping system is configured to engage with the cylinder housing in the at least one position to prevent movement of the cylinder relative to the cylinder housing. The propping system includes a sleeve configured to receive the cylinder assembly. The sleeve surrounds (e.g., circumferentially surrounds, etc.) the cylinder assembly such that the cylinder assembly is substantially enclosed within (e.g., covered by) the sleeve, which, advantageously, minimizes the overall size of the propping system. The sleeve also prevents access to the interface between the cylinder and the cylinder housing, thereby reducing the risk of injury to a vehicle operator while the cylinder assembly is in operation.

The propping system includes a locking member configured to engage with the cylinder housing and an upper ledge of the sleeve to prevent the cylinder housing from retracting into the sleeve. To engage the propping system, an operator simply places the locking member on the upper ledge of the sleeve, in between the cylinder housing and the upper ledge edge of the sleeve. When placed upon the upper ledge of the sleeve, the locking member is forced up against, and engages with, a circumferential portion of the cylinder. The amount of effort required to engage the propping system is much less than conventional propping systems, which typically require the operator to manipulate large and heavy support structures (e.g., arms, etc.) that are approximately equal in length to the cylinder.

Among other advantageous features, the sleeve may include a slot configured to receive the locking member therein when "locking out" the cylinder assembly to help prevent the locking member from becoming dislodged from the sleeve. Additionally, the locking member may be configured to engage with a support member or locking tab disposed on the sleeve to further prevent the locking member from becoming separated from the sleeve once engaged with the cylinder. In some embodiments, the sleeve may include multiple slots along a length of the sleeve to secure the cylinder assembly (e.g., housing) in different positions relative to the sleeve. These and other advantageous features will become apparent to those reviewing the present disclosure and figures.

Referring to FIG. 1, a vehicle, shown as vehicle 10, includes a vehicle chassis, shown as chassis 20 (e.g., frame, etc.) and a vehicle body, shown as body 30 coupled thereto. The vehicle 10 may be configured as an on-road vehicle or an off-road vehicle. In one embodiment, the vehicle is an off-road construction vehicle such as a skid steer, excavator, or front-end loader. In other embodiments, the vehicle is a mobile crane or cement truck. In the exemplary embodiment of FIG. 1, the vehicle 10 is a refuse truck (e.g., a garbage truck, a waste collection truck, a sanitation truck, etc.) configured to transport refuse from various waste receptacles within a municipality to a storage and/or processing facility (e.g., a landfill, an incineration facility, a recycling facility, etc.).

As shown in FIG. 1, the vehicle 10 includes a plurality of components that are movably coupled to the chassis 20. In other words, the vehicle 10 includes a plurality of components that may move relative to the chassis 20 to facilitate vehicle operations. For example, the vehicle 10 includes a set of forks 32 used to engage the vehicle 10 with a refuse container. The forks 32 are hingedly coupled to a support frame 34 such that the forks 32 rotate relative to the support frame 34. The support frame 34 is hingedly coupled to the body 30. The forks 32 and support frame 34 may be used to empty the contents of the refuse container into the body 30 by lifting the refuse container up and over the body 30 and/or tilting the refuse container. The vehicle 10 also includes a lift system used to reposition the body 30 relative to the chassis 20 (e.g., to raise and lower the body 30 such that a gap is formed between the body 30 and the chassis 20). Among other benefits, the lift system may be used by a technician or operator to access vehicle components (e.g., hydraulic system components, electrical system components, etc.) located beneath the body 30, and to thereby facilitate maintenance operations for the vehicle 10.

As shown in FIG. 1, the vehicle 10 includes a plurality of cylinder assemblies configured to manipulate a position of a vehicle component relative to other parts of the vehicle. As shown in FIG. 1, the vehicle 10 includes a first cylinder assembly 40 configured to manipulate a position of the forks 32 relative to the support frame 34, a second cylinder assembly 42 configured to manipulate a position of the support frame 34 relative to the body 30, and a third cylinder assembly, shown as lift cylinder assembly 44 configured to manipulate a position of the body 30 relative to the chassis 20. In other embodiments, the vehicle 10 includes additional, fewer, and/or different numbers and/or arrangements of cylinder assemblies. As shown in FIG. 1, each of the first cylinder assembly 40, the second cylinder assembly 42, and the lift cylinder assembly 44 includes a cylinder housing and a cylinder slidably engaged with the cylinder housing. A first end of the cylinder is disposed in an internal cavity defined by the cylinder housing. A second end of the cylinder extends beyond (e.g., outwardly from, away from, etc.) the cylinder housing. The cylinder is configured to move (e.g., slide) relative to the cylinder housing, into and out of the cylinder housing, in a direction that is substantially parallel to an axis of the cylinder housing. The cylinder is repositionable between a retracted position in which a substantial portion of the cylinder is contained within the internal cavity of the cylinder housing, and an extended position in which the cylinder is moved away from (e.g., extends substantially outwardly from, is positioned substantially outside of, etc.) the cylinder housing.

As shown in FIG. 1, the first cylinder assembly 40, the second cylinder assembly 42, and the lift cylinder assembly 44 are used to reposition the movable components, including the forks 32, the support frame 34, and the body 30, respectively, of the vehicle 10. Each of the first cylinder assembly 40, the second cylinder assembly 42, and the lift cylinder assembly 44 includes a first end and a second end disposed (e.g., positioned, located, etc.) opposite the first end. The first end is coupled to one of the stationary components of the vehicle 10 (e.g., a non-movable component, a component that the movable component is secured and/or positioned relative to, a component that is stationary relative to the vehicle chassis, etc.). The second end of each of the first cylinder assembly 40, the second cylinder assembly 42, and the lift cylinder assembly 44 is coupled to a moving component of the vehicle 10 such as the forks 32, the support frame 34, and the body 30. For example, as shown in FIG. 1, a first end 46 of the first cylinder assembly 40 (used to reposition the forks 32) is hingedly coupled to the support frame 34. A second end 48 of the first cylinder assembly 40 is hingedly coupled to the forks 32. In the exemplary embodiment of FIG. 1, the first end 46 of the first cylinder assembly 40 is integrally formed with the cylinder housing, while the second end 48 of the first cylinder assembly 40 is integrally formed with the cylinder (e.g., the second end of the cylinder). In other embodiments, the configuration may be reversed (e.g., the first end 46 is integrally formed with the cylinder, while the second end 48 is integrally formed with the cylinder housing).

Figure 2:
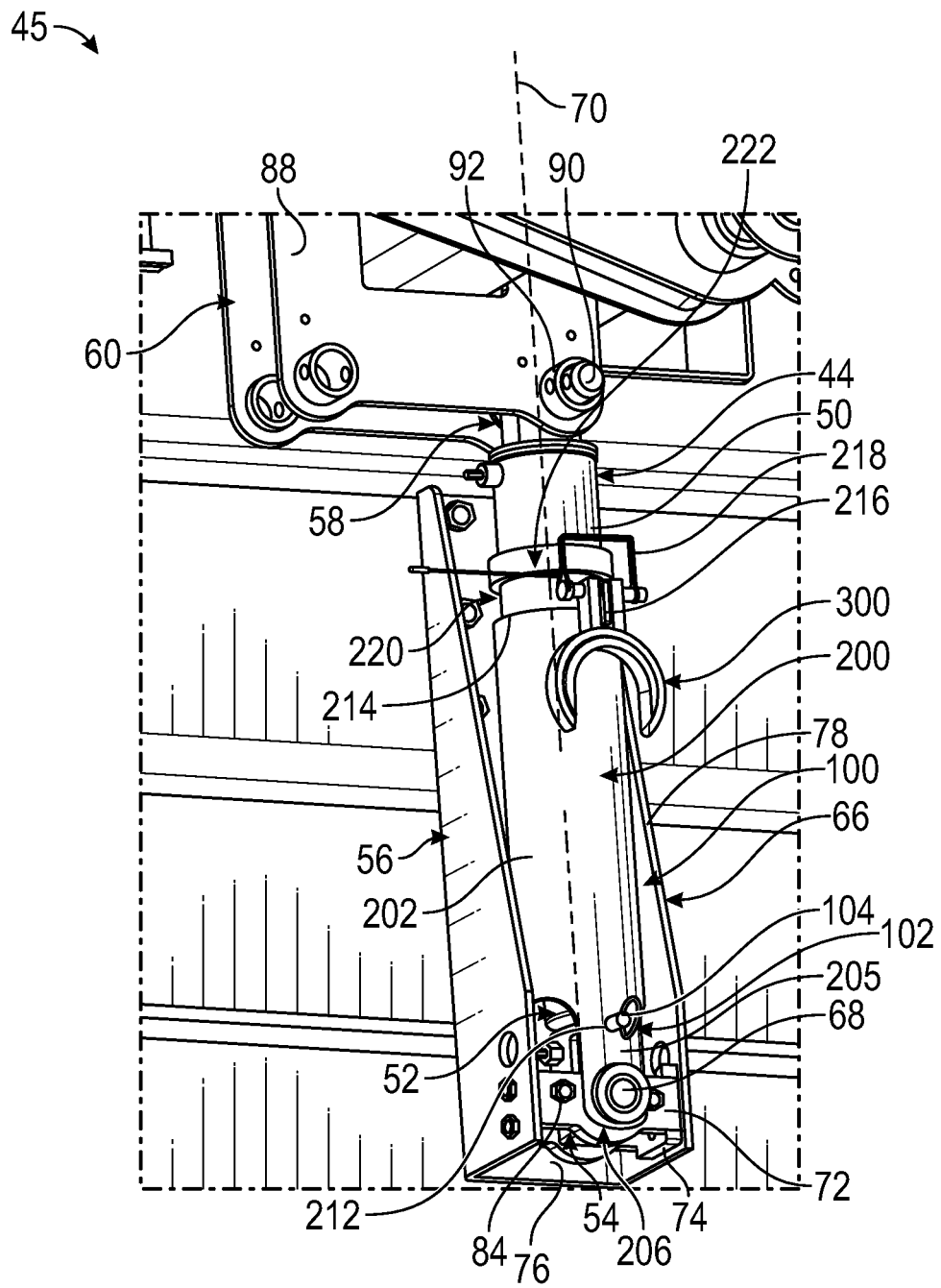
FIG. 2 is a perspective view of the cylinder propping system of FIG. 1, according to an exemplary embodiment.
Figure 3B:
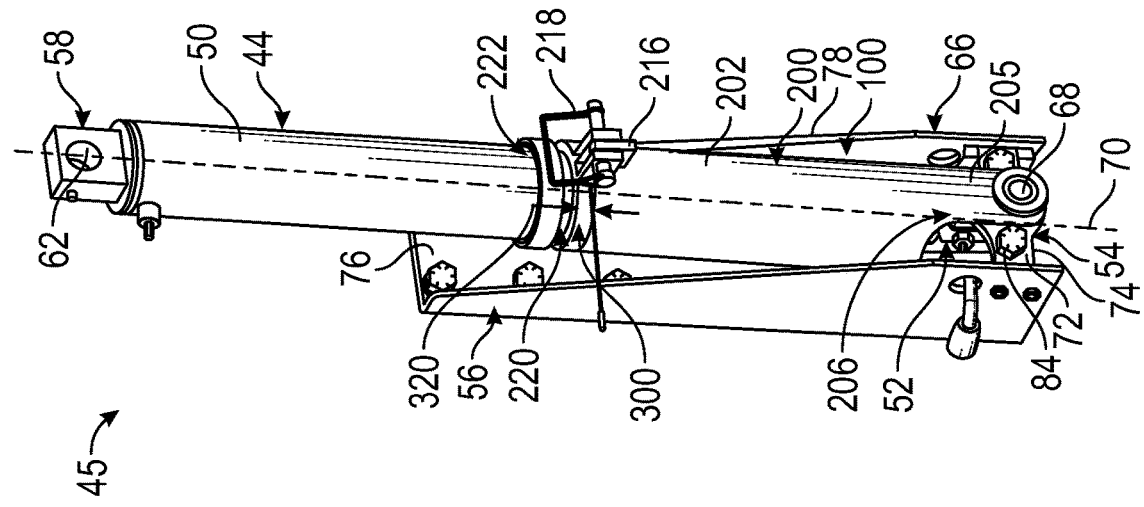
FIG. 3B is a perspective view of the cylinder propping system of FIG. 1 in an extended position, according to an exemplary embodiment.
Figure 3A:
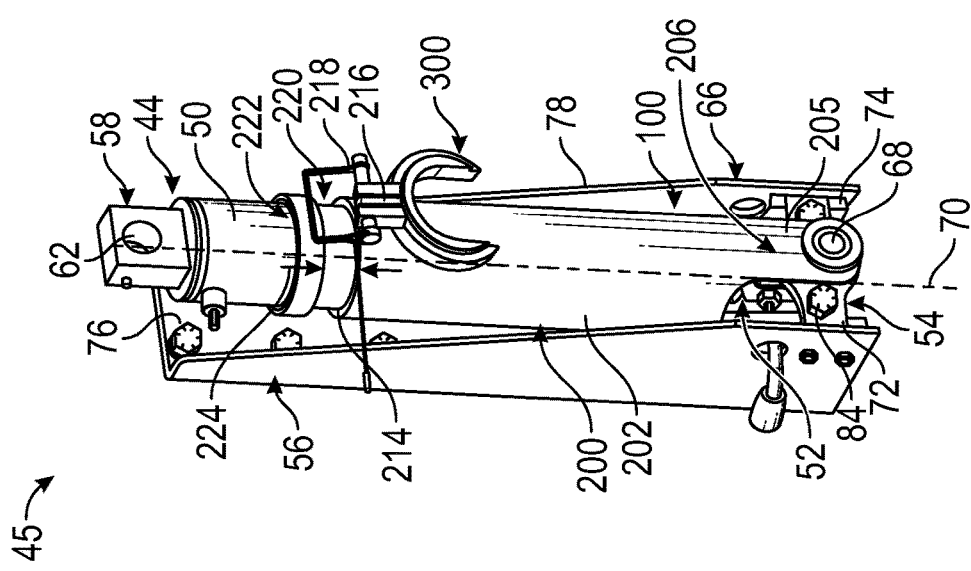
FIG. 3A is a perspective view of the cylinder propping system of FIG. 1 in a retracted position, according to an exemplary embodiment.

Referring now to FIG. 2, a lift system 45 is shown, according to an exemplary embodiment. The lift system 45 is used to reposition (e.g., raise or lower) the body 30 relative to the chassis 20 of the vehicle 10. As shown in FIG. 2, the lift system 45 includes the lift cylinder assembly 44 and a cylinder propping system, shown as propping system 100. The lift cylinder assembly 44 includes a cylinder housing 50 and a cylinder 52 slidably engaged to the cylinder housing 50. Referring to FIGS. 3A-3B, the cylinder assembly 44 is reconfigurable between a retracted position in which a substantial portion of the cylinder 52 is contained within the cylinder housing 50 (FIG. 3A), and an extended position in which the cylinder 52 is moved away from (e.g., extends substantially outwardly from, positioned substantially outside of, etc.) the cylinder housing 50 (FIG. 3B). In the retracted position, as shown in FIG. 3A, the cylinder housing 50 is substantially surrounded by (e.g., contained substantially within, etc.) a sleeve 200 of the propping system 100. The sleeve 200 extends along a length of the cylinder assembly 44, in a direction substantially parallel to an axis 70 (e.g., a central axis) of the cylinder assembly 44. A length of the sleeve 200 is approximately equal to a length of the cylinder 52 and cylinder housing 50. As shown in FIG. 3B, the length of the sleeve 200, determines, in part, the maximum amount of extension of the cylinder housing 50 relative to the cylinder 52 that can be supported by the propping system 100.

The lift cylinder assembly 44 and the propping system 100 may be mounted to the vehicle 10 in a variety of different ways. In the exemplary embodiment of FIG. 2, the lift system 45 includes bracket assemblies, shown as chassis bracket assembly 56 and body bracket assembly 60, which are used to couple the lift cylinder assembly 44 to the chassis 20 and the body 30, respectively. A first end 54 of the lift cylinder assembly 44 is mechanically coupled to chassis bracket assembly 56, which is mechanically coupled (e.g., affixed, fastened, etc.) to the chassis 20 of the vehicle 10. A second end 58 of the lift cylinder assembly 44 is coupled to a body bracket assembly 60, which is mechanically coupled (e.g., affixed, fastened, etc.) to the body 30 of the vehicle 10. In some embodiments, each end 54, 58 of the lift cylinder assembly 44 may be permanently affixed to a corresponding one of the chassis bracket assembly 56 and the body bracket assembly 60. In other embodiments, each end (e.g., the first end 54 and the second end 58) of the lift cylinder assembly 44 may be coupled directly to the chassis 20 or the body 30, rather than utilizing intermediate bracket assemblies (e.g., the chassis bracket assembly 56 and the body bracket assembly 60). In the exemplary embodiment of FIG. 2, each end (e.g., the first end 54 and the second end 58) of the cylinder assembly 44 is hingedly coupled to a corresponding one of the chassis bracket assembly 56 and the body bracket assembly 60, such that the lift cylinder assembly 44 may rotate relative to the chassis bracket assembly 56 and the body bracket assembly 60. Among other benefits, hingedly coupling the first end 54 and the second end 58 of the lift cylinder assembly 44 to the chassis bracket assembly 56 and the body bracket assembly 60, respectively, can reduce stress on the lift cylinder assembly 44 during normal operation (e.g., by allowing for small amounts of rotation to accommodate any misalignment between the chassis 20 and the body 30, etc.).

Figure 4:
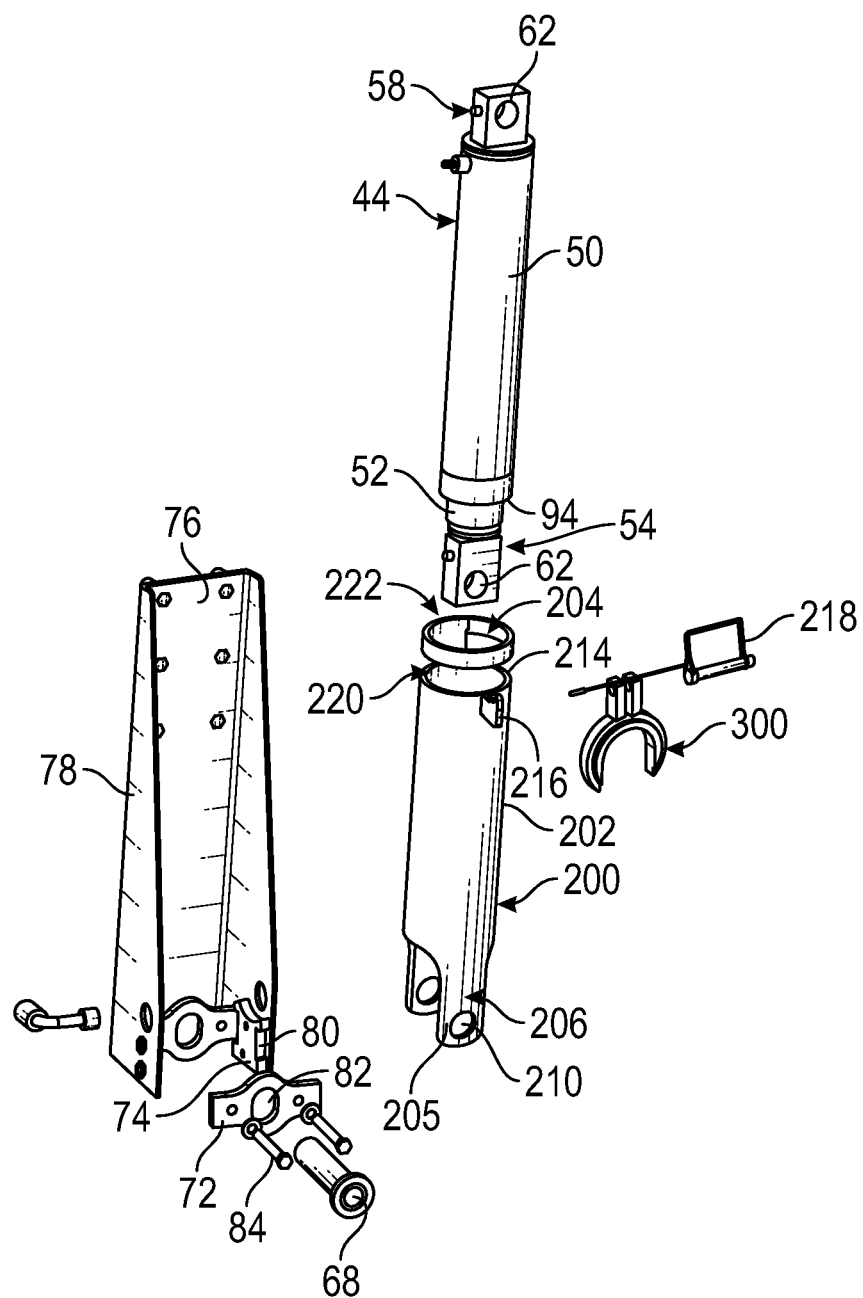
FIG. 4 is an exploded view of the cylinder propping system of FIG. 1, according to an exemplary embodiment.

Referring now to FIG. 4, the cylinder assembly 44 includes a first end opening 62 configured to couple the first end 54 of the cylinder assembly 44 to the chassis bracket assembly 56 and a second end opening 64 configured to couple the second end 58 of the cylinder assembly 44 to the body bracket assembly 60. The first end opening 62 is disposed on an exposed end of the cylinder 52 that is positioned outside of the cylinder housing 50 when the lift cylinder assembly is in a fully retracted position. The second end opening 64 is disposed on an end of the cylinder housing 50 on an opposing end of the lift cylinder assembly 44. In the exemplary embodiment of FIG. 4, the first end opening 62 and the second end opening 64 are substantially circular and extend through the cylinder assembly 44, in a direction that is substantially normal to an axis 70 of the lift cylinder assembly 44. In other embodiments, a different fastening mechanism may be used to secure the lift cylinder assembly 44 to the vehicle 10.

As shown in FIG. 4, the chassis bracket assembly 56 includes a bracket 66, an end bolt 68, and a plurality of connecting members, including a bolt connecting member 72 and a side wall connecting member 74 arranged in substantially perpendicular orientation with respect to the bolt connecting member 72. The bracket 66 includes a base wall 76 and two side walls 78 extending substantially perpendicular to the base wall 76. Together, the base wall 76 and the two side walls 78 form a C-channel sized to receive the lift cylinder assembly 44 and the propping system 100 for the lift cylinder assembly 44. The base wall 76 includes a plurality of holes disposed proximate to an upper end of the bracket assembly 56, by which the base wall 76 may be fastened to the chassis 20 of the vehicle 10 (e.g., by using bolts, screws, or another suitable fastener). In other embodiments, the base wall 76 may be welded or otherwise coupled to the chassis 20. In the exemplary embodiment of FIG. 2, the first end 54 of the lift cylinder assembly 44 is coupled to the side walls 78 proximate to a lower end of the bracket assembly 56. A length of the bracket assembly 56, parallel to the central axis 70, is greater than the length of the sleeve 200 such that the bracket assembly 56 surround at least a portion of the sleeve 200 along an entire length of the sleeve 200. The bracket assembly 56 is sized to accommodate the length of the lift cylinder assembly 44 in the retracted position. As shown in FIG. 4, one of the side walls 78 includes an aperture configured to receive a hydraulic line. In other embodiments, the side walls 78 may include one or more apertures or holes configured to receive and/or support other plumbing or electrical components (e.g., wiring, etc.).

In the exemplary embodiment of FIG. 4, the bracket assembly 56 includes a plurality of connecting members, shown as bolt connecting members 72, and side wall connecting members 74. Together, the bolt connecting member 72 and the side wall connecting members 74 are configured to secure the first end 54 of the cylinder assembly 44 (and a first end 206 of the sleeve 200) in position relative to the bracket assembly 56. In the exemplary embodiment of FIG. 3, the chassis bracket assembly 56 includes two side wall connecting members 74 and two bolt connecting members 72. Each of the side wall connecting members 74 is coupled (e.g., fastened, etc.) to an inside edge of a side wall 78 proximate to the lower end of the chassis bracket assembly 56. The side wall connecting members 74 include recessed portions 80, which are configured to engage with the bolt connecting members 72 to facilitate alignment between the bolt connecting members 72 and the side wall connecting members 74. The recessed portions 80 also prevent vertical movement of the bolt connecting members 72 relative to the bracket assembly 56 (e.g., movement of the bolt connecting members 72 in a direction that is substantially parallel to the axis 70 of the cylinder assembly 44, etc.).

In the exemplary embodiment of FIG. 4, the bolt connecting members 72 extend between the side walls 78 of the bracket assembly 56, in a direction that is substantially perpendicular to the side walls 78. The bolt connecting members 72 include an aperture 82 positioned at an intermediate position between the side walls 78 (e.g., approximately half way between the side walls 78, at a central position between the side walls 78, etc.). The aperture 82 of each bolt connecting member 72 is configured to receive an end bolt 68 therethrough. The bolt connecting members 72 are fastened together by bolts 84, that pull the bolt connecting members 72 toward one another, and against the recessed portions 80 of the side wall connecting members 74. The side wall connecting members 74 are "sandwiched" or otherwise positioned between the bolt connecting members 72 such that a gap 86 is formed therebetween. The first end 54 of the lift cylinder assembly 44 is secured in position within the gap 86 by the end bolt 68, which passes through the apertures 82 of the bolt connecting members 72 and the first end opening 62.

Referring now to FIG. 2, the second end 58 of the lift cylinder assembly 44 (e.g., an end of the cylinder housing 50) is coupled to the body bracket assembly 60. The second end 58 of the lift cylinder assembly 44 is disposed in a space formed between a pair of substantially parallel support members 88. In the exemplary embodiment of FIG. 2, a second eyebolt 90 is inserted into a through-hole 92 of the support members 88 and into the second end opening 64 to secure the second end 58 of the lift cylinder assembly 44 in position relative to the body 30. In other embodiments, the coupling mechanism between the lift cylinder assembly 44 and the body 30 of the vehicle 10 may be different. In some embodiments, the orientation of the lift cylinder assembly 44 and the propping system 100 may be reversed such that the second end 58 of the lift cylinder assembly 44 is coupled to the chassis bracket assembly 56 and the first end 54 of the lift cylinder assembly 44 is coupled to the body bracket assembly 60 (e.g., the lift cylinder assembly 44 and propping system 100 flipped 180° from the orientation shown in FIG. 2). In other embodiments, the orientation of the lift system 45 may be reversed such that the chassis bracket assembly 56 is secured to the body 30 and the body bracket assembly 60 is secured to the chassis 20.

Figure 5:
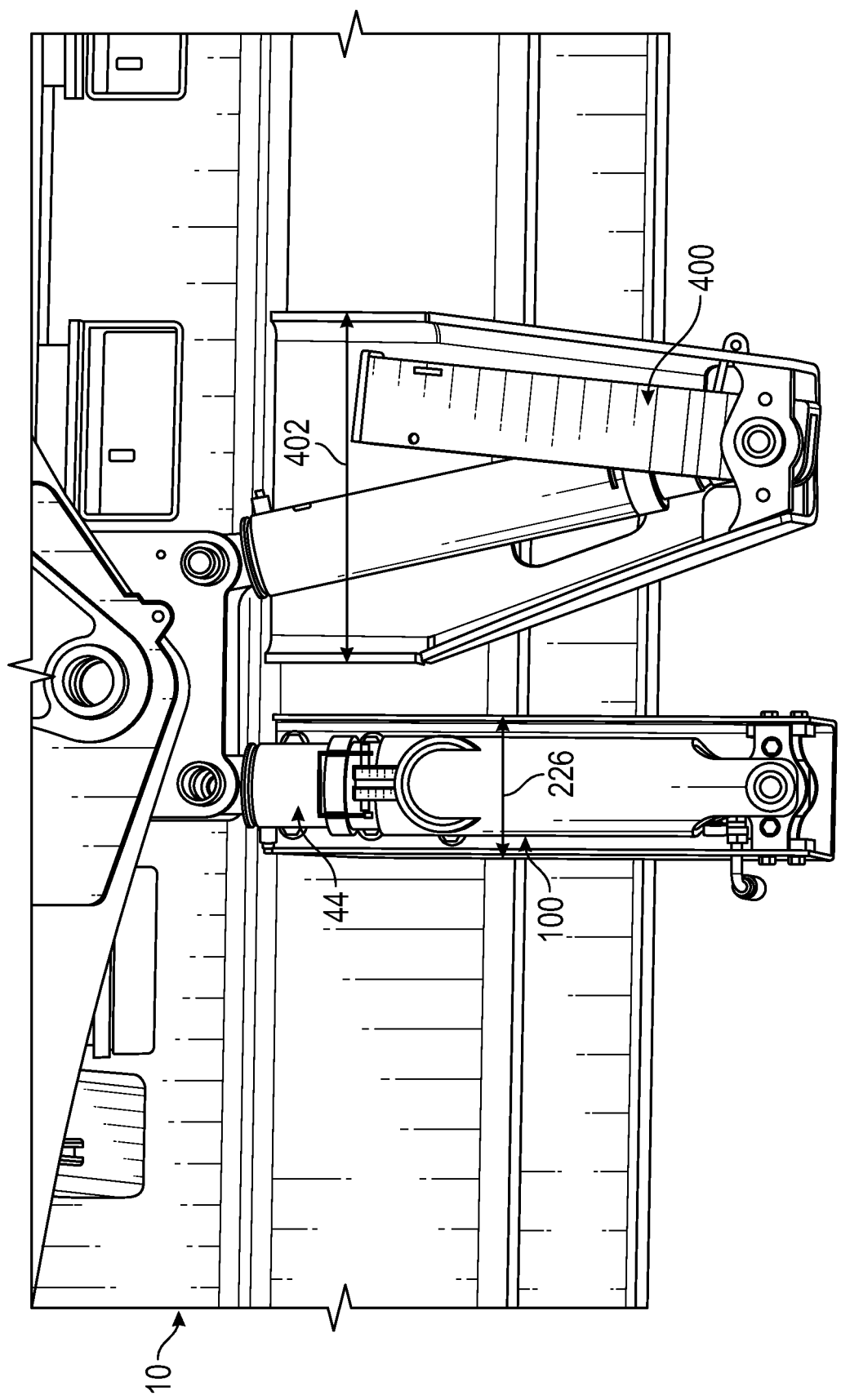
FIG. 5 is a side view of the cylinder propping system of FIG. 1 and a rotating-arm type cylinder propping system, according to an exemplary embodiment.

The propping system 100 is configured to engage with the lift cylinder assembly 44 in at least one position to prevent the cylinder 52 from retracting into the cylinder housing 50. As shown in FIG. 4, the propping system 100 includes a sleeve 200 and a locking member 300. The sleeve 200 includes a substantially cylindrical outer wall 202 (e.g., a cylindrical tube, etc.) defining a cavity 204. The cavity 204 is configured to receive at least a portion of the lift cylinder assembly 44 therein. An inner diameter of the cavity 204 is larger than an outer diameter of the cylinder housing 50 so as to accommodate the cylinder housing 50. As shown in FIGS. 2 and 3A, in the retracted position, the sleeve 200 substantially surrounds (e.g., circumferentially surrounds) the cylinder housing 50. Among other benefits, utilizing a sleeve 200 that surrounds the lift cylinder assembly 44, as opposed to a cylinder propping member (e.g., arm or other member configured to engage with the cylinder housing 50 in the extended position), significantly reduces the size of the lift system 45. By way of example, FIG. 5 shows a size comparison of the propping system 100 and a rotating-arm type propping system 400 in which an arm is rotated into place over an extended cylinder to prevent the cylinder from retracting into a cylinder housing. In the comparison shown, the rotating-arm type propping system 400 has an overall width 402, substantially parallel to a longitudinal axis of the vehicle 10 (e.g., front to back), of approximately 14.3 in., whereas the propping system 100 of the present disclosure has an overall width 226 of approximately 5.7 in. In other words, because the propping system 100 does not include any rotating members, the overall width 226 can be substantially reduced.

The outer wall 202 of the sleeve 200 is coupled to the cylinder 52 and secured in position relative to the cylinder 52. In the exemplary embodiment of FIGS. 2-4, the sleeve 200 includes a pair of extension pieces 205 (e.g., ears, tabs, etc.) proximate to a first end 206 of the sleeve 200. The extension pieces 205 extend in a direction oriented substantially parallel to an axis 208 (e.g., central axis, etc.) of the sleeve 200. An end bolt 68 is configured to engage with the extension pieces 205 to secure the first end 206 of the sleeve 200 in position with respect to the chassis bracket assembly 56. In the exemplary embodiment of FIGS. 2-4, the end bolt 68 is received within an opening 210 passing through each of the extension pieces 205 so as to hingedly couple the sleeve 200 to the chassis bracket assembly 56. As shown in FIGS. 2-3B, each extension piece 205 is separated from the first end 54 of the lift cylinder assembly 44 by one of the bolt connecting members 72. In other embodiments, one or more extension pieces 205 may be disposed in the gap 86 between the bolt connecting members 72. In yet other embodiments, the extension pieces 205 may be directly coupled to the side walls 78. In yet other embodiments, the extension pieces 205 may be coupled to a plurality of connecting members separate from the bolt connecting members 72 and the side wall connecting members 74.

In the exemplary embodiment of FIG. 2, the propping system 100 includes a locating member 102 configured to prevent the sleeve 200 from rotating relative to the lift cylinder assembly 44 to prevent the sleeve 200 from inadvertently contacting the cylinder 52 and/or the cylinder housing 50. The locating member 102 includes a locating pin 104. The locating pin 104 extends through a locating hole, shown as hole 212 in the sleeve 200 and into an opening (not shown) in the cylinder 52. In other embodiments, the sleeve 200 may include internal ribs or protrusions proximate the first end 206 of the sleeve 200 that are configured to center the sleeve 200 with respect to the cylinder 52. In yet other embodiments, the sleeve 200 and/or lift cylinder assembly 44 may include another type of centering and/or positioning feature configured to position the lift cylinder assembly 44 within the sleeve 200.

In the exemplary embodiment of FIGS. 2-4, the propping system 100 includes a locking member 300. The locking member 300 is configured to engage with the sleeve 200 and the cylinder housing 50 to prevent the cylinder housing 50 from retracting into the sleeve 200 when the cylinder assembly 44 is in an extended position (and to prevent the cylinder 52 from retracting into the cylinder housing 50). In an exemplary embodiment, a first side 302 of the locking member 300 is configured to engage with (e.g., contact, etc.) an upper ledge 214 of the sleeve 200. A second side 304 of the locking member 300, opposite the first side 302, is configured to engage with (e.g., contact, etc.) an end surface 94 of the cylinder housing 50.

Figure 6:
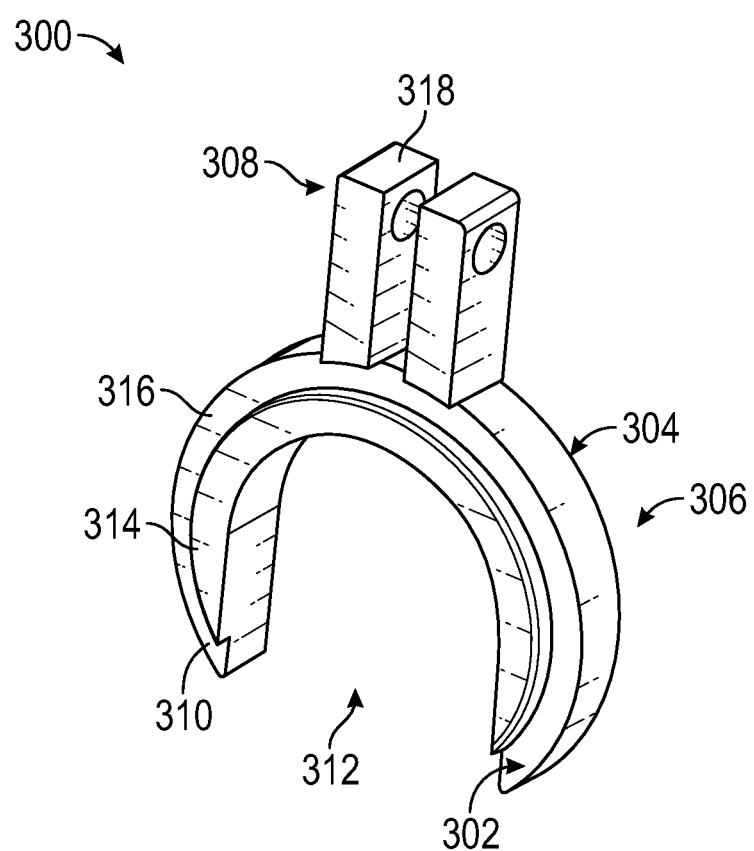
FIG. 6 is a bottom perspective view of a locking member for the cylinder propping system of FIG. 1, according to an exemplary embodiment.

Referring now to FIG. 6, the locking member 300 includes an interface portion 306 and a retaining portion 308 coupled thereto. The locking member 300 may be made from a single piece of material or multiple pieces of material that are welded or otherwise coupled together. In the exemplary embodiment of FIG. 6, the interface portion 306 is substantially cylindrical (e.g., the edges at an outer perimeter of the interface portion 306 are curved). In other embodiments, the interface portion 306 may be substantially rectangular (e.g., the edges may be configured in the shape of a tuning fork, etc.) or another shape that prevents the cylinder housing 50 from retracting into the sleeve 200.

The interface portion 306 includes two extensions 310 (e.g., forks, etc.) forming a receiving slot 312. The receiving slot 312 is configured to receive the cylinder 52 (e.g., the shaft of the cylinder) and at least partially surround the cylinder 52. In the exemplary embodiment of FIG. 6, the receiving slot 312 is substantially U-shaped and is configured to surround the cylinder 52 along a circumferential portion of the cylinder 52 (e.g., a 180° portion of an outer perimeter of the cylinder 52, etc.). Among other benefits, using a U-shaped receiving slot 312 ensures a larger contact area between the second side 304 of the locking member and an end surface of the cylinder housing 50. In other embodiments, the receiving slot 312 may be V-shaped, rectangular, or another shape. In some embodiments, the interface portion 306 may be configured to circumferentially surround (e.g., wrap around, encircle, etc.) a smaller portion of the cylinder 52.

In the exemplary embodiment of FIG. 6, the interface portion 306 includes a protrusion 314 forming a step 316 (e.g., a ledge, etc.) along the first side 302 of the locking member 300. An outer diameter of the protrusion is less than an inner diameter of the sleeve 200 such that the protrusion may be at least partially received within the cavity 204 of the sleeve 200. Among other benefits, the protrusion 314 helps to prevent the locking member 300 from becoming dislodged from (e.g., falling out of, etc.) the sleeve 200 once positioned on the upper ledge 214 of the sleeve 200. The step 316 is configured to contact the upper ledge 214 of the sleeve 200 such that any forces applied to the locking member 300, by the lift cylinder assembly 44, are transmitted through the locking member 300 to the sleeve 200.

The retaining portion 308 of the locking member 300 is configured to secure the locking member 300 to a support member 216 (e.g., a tab, etc.) disposed on the sleeve 200 (see also FIGS. 2-4). Among other benefits, the support member 216 prevents the locking member 300 from becoming dislodged or being inadvertently removed when positioned between the sleeve 200 and the cylinder housing 50. In the exemplary embodiment of FIG. 6, the retaining portion 308 includes two substantially parallel posts 318 that extend from the interface portion 306. The posts 318 extend away from the receiving slot 312 of the interface portion 306. As shown in FIGS. 2-3B, the support member 216 is received in between the posts 318. The locking member 300 is hingedly coupled to the sleeve 200 by a retaining clip 218 (see FIGS. 2-4) that passes through a hole that extends through an end of the posts 318 and through the support member 216. When the locking member 300 is not in use (e.g., when the locking member 300 is removed from the upper ledge 214 of the sleeve 200, when the cylinder assembly 44 is in the retracted position as shown in FIGS. 2-3A, etc.), the support member 216 may be utilized to maintain the locking member 300 in an easily accessible position alongside the sleeve 200. In other embodiments, the retaining portion 308 may only include a single post configured to engage with the support member 216. In yet other embodiments, a different type of retaining mechanism (e.g., clip, bolt, etc.) may be used to prevent the locking member 300 from being inadvertently removed from the sleeve 200.

According to an exemplary embodiment, as shown in FIG. 4, the sleeve 200 includes a slot, shown as slot 220, configured to receive the locking member 300 therein. The slot 220 is disposed at an intermediate position between opposing ends of the sleeve 200. In the embodiment of FIG. 4, the slot 220 is disposed proximate to a second end 222 of the sleeve 200. In other embodiments, the position of the slot 220 along the sleeve 200 may be different. The position of the slot 220 determines a position at which the cylinder housing 50 is supported by the locking member 300 (e.g., an extended position of the cylinder assembly 44). As shown in FIGS. 3A-3B, the slot 220 extends through the outer wall of the sleeve 200 in a direction that is substantially normal to the axis 208 of the sleeve 200. A height 224 of the slot 220, in a direction substantially parallel to the axis 208 of the sleeve 200, is slightly larger than a height 320 of the interface portion 306 of the locking member 300. Among other benefits, the slot 220 helps to position the locking member 300 and prevents the locking member 300 from becoming dislodged from the sleeve 200 once positioned on a ledge of the slot 220 (e.g., the slot 220 prevents the locking member 300 from rotating up and away from the cylinder 52 when the lift cylinder assembly 44 is in the extended position). The support member 216 is disposed proximate to the slot 220, so that the retaining portion 308 (e.g., posts 318) may be coupled to the support member 216 when the locking member 300 is engaged with the slot 220.

In other exemplary embodiments, the sleeve 200 includes a plurality of slots 220 to provide more than one position at which the cylinder housing 50 may be secured relative to the sleeve 200. Among other benefits, the slots provide a mechanism for adjustment of the position at which the cylinder housing 50 is supported, which may be beneficial in operating conditions where less than a full extension of the lift cylinder assembly 44 is required.

The propping system 100, of which various exemplary embodiments are disclosed herein, provides several advantages over conventional cylinder propping systems. Among other benefits, the propping system 100 occupies a much smaller volume of space than conventional systems. The more compact arrangement allows the propping system 100 to be integrated into smaller vehicles and/or areas in the vehicle that are space limited. In addition, operation of the propping system 100 does not require multiple users, or movement of large and heavy components that are similar in size to the cylinder assembly being supported. Rather, a user or operator may perform locking operations by manipulating a locking member 300 that is only a small fraction of the size of the supported components.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the cylinder propping system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A cylinder propping system, comprising:
a sleeve comprising an outer wall, the outer wall defining an inner cavity sized to receive at least a portion of a cylinder assembly therein, a first end of the outer wall configured to hingedly couple to one end of the cylinder assembly, the outer wall further defining a ledge spaced apart from the first end;
a locking member sized to engage with the ledge of the sleeve, between the ledge and a cylinder housing of the cylinder assembly, to prevent movement of the cylinder housing in at least one direction along a central axis of the sleeve; and
a bracket assembly, the bracket assembly comprising a bracket defining a base wall and a plurality of side walls perpendicular to the base wall, wherein together the base wall and the plurality of side walls form a channel sized to receive the sleeve therein.

2. The cylinder propping system of claim 1, wherein the bracket assembly further comprises a plurality of connecting members configured to hingedly couple the first end of the sleeve to the bracket, and wherein the plurality of connecting members are configured to space the sleeve apart from the bracket.

3. The cylinder propping system of claim 1, wherein the locking member is sized to surround a cylinder of the cylinder assembly on at least three sides.

4. The cylinder propping system of claim 1, wherein the sleeve further comprises a slot disposed in the outer wall at an intermediate position along the outer wall, wherein the slot is sized to receive at least a portion of the locking member therein.

5. The cylinder propping system of claim 4, wherein a height of the slot in a direction parallel to the central axis of the sleeve, is greater than a height of the locking member.

6. The cylinder propping system of claim 1, wherein the locking member comprises an interface portion and a retaining portion, wherein the interface portion is configured to engage with the ledge and a portion of the cylinder assembly to prevent movement of the cylinder housing in at least one direction along the central axis, and wherein the retaining portion is configured to couple the locking member to the sleeve when the interface portion is engaged with the ledge.

7. The cylinder propping system of claim 1, wherein the locking member comprises a protrusion forming a step along one side of the locking member, and wherein the protrusion is sized to be received within the inner cavity.

8. The cylinder propping system of claim 1, wherein the outer wall forms a cylindrical tube.

9. The cylinder propping system of claim 1, wherein the sleeve further comprises a pair of extension pieces proximate to the first end of the sleeve, wherein each one of the pair of extension pieces extend in a direction that is parallel to the central axis of the sleeve, and wherein the pair of extension pieces are configured to hingedly couple to the one end of the cylinder assembly.

10. A lift system for a vehicle, comprising:
a cylinder assembly comprising a cylinder housing and a cylinder slidably engaged with the cylinder housing;
a cylinder propping system coupled to one end of the cylinder assembly, the cylinder propping system comprising:
a sleeve comprising an outer wall, the outer wall surrounding at least a portion of the cylinder assembly;
a locking member, the locking member sized to engage with the sleeve to prevent movement of the cylinder housing in at least one direction along a central axis of the sleeve; and
a bracket assembly coupled to the sleeve, the bracket assembly comprising a bracket defining a base wall and a plurality of side walls perpendicular to the base wall, wherein together the base wall and the plurality of side walls form a channel, and wherein at least a portion of the sleeve is positioned at within the channel.

11. The lift system of claim 10, wherein the locking member is sized to at surround the cylinder on at least three sides.

12. The lift system of claim 10, wherein the sleeve further comprises a slot disposed in the outer wall at an intermediate position along the outer wall, wherein the slot is sized to receive at least a portion of the locking member therein.

13. The lift system of claim 10, wherein the locking member comprises an interface portion and a retaining portion, wherein the interface portion is configured to engage with a ledge of the sleeve and a portion of the cylinder assembly to prevent movement of the cylinder housing in at least one direction along the central axis, and wherein the retaining portion is configured to couple the locking member to the sleeve when the interface portion is engaged with the ledge.

14. The lift system of claim 10, wherein the outer wall defines an inner cavity, wherein the locking member comprises a protrusion forming a step along one side of the locking member, and wherein the protrusion is sized to be received within the inner cavity.

15. A vehicle, comprising:
a chassis;
a body coupled to the chassis; and
a lift system coupled to the chassis and the body, the lift system comprising:

a cylinder assembly comprising a cylinder housing and a cylinder slidably engaged with the cylinder housing;

a cylinder propping system coupled to one end of the cylinder assembly, the cylinder propping system comprising:

a sleeve comprising an outer wall, the outer wall surrounding at least a portion of the cylinder assembly; and a locking member, the locking member sized to engage with the sleeve to prevent movement of the cylinder housing in at least one direction along a central axis of the sleeve; and a bracket assembly coupled to the sleeve and one of the chassis or the body, the bracket assembly comprising a bracket defining a base wall and a plurality of side walls perpendicular to the base wall, wherein together the base wall and the plurality of side walls form a channel, and wherein at least a portion of the sleeve is positioned at within the channel.

16. The vehicle of claim 15, wherein the sleeve further comprises a slot disposed in the outer wall at an intermediate position along the outer wall, wherein the slot is sized to receive at least a portion of the locking member therein.

17. The vehicle of claim 15, wherein the locking member comprises an interface portion and a retaining portion, wherein the interface portion is configured to engage with a ledge of the sleeve and a portion of the cylinder assembly to prevent movement of the cylinder housing in at least one direction along the central axis, and wherein the retaining portion is configured to couple the locking member to the sleeve when the interface portion is engaged with the ledge.

* * * * *